(12) United States Patent
Hoshi et al.

(10) Patent No.: US 11,905,383 B2
(45) Date of Patent: Feb. 20, 2024

(54) GAS BARRIER FILM

(71) Applicant: TOPPAN PRINTING CO., LTD., Tokyo (JP)

(72) Inventors: Sayaka Hoshi, Tokyo (JP); Junichi Kaminaga, Tokyo (JP); Yuki Omura, Tokyo (JP); Yuka Nomoto, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 108 days.

(21) Appl. No.: 17/080,294

(22) Filed: Oct. 26, 2020

(65) Prior Publication Data

US 2021/0039371 A1 Feb. 11, 2021

Related U.S. Application Data

(63) Continuation of application No. PCT/JP2019/015764, filed on Apr. 11, 2019.

(30) Foreign Application Priority Data

Apr. 27, 2018 (JP) ................................ 2018-087687

(51) Int. Cl.
*B32B 7/12* (2006.01)
*C08J 7/048* (2020.01)
*C08J 7/04* (2020.01)

(52) U.S. Cl.
CPC ............... *C08J 7/0427* (2020.01); *B32B 7/12* (2013.01); *C08J 7/048* (2020.01); *B32B 2255/26* (2013.01);
(Continued)

(58) Field of Classification Search
CPC . C08J 7/0427; C08J 7/048; B32B 2307/7246; B32B 2307/7244; B32B 2307/7242
See application file for complete search history.

(56) References Cited

U.S. PATENT DOCUMENTS

| | | | |
|---|---|---|---|
| 2002/0135728 A1* | 9/2002 | Tatsuta | G02F 1/133345 349/158 |
| 2004/0253463 A1* | 12/2004 | Inui | C09D 129/04 428/448 |
| 2014/0065406 A1* | 3/2014 | Berglund | D21H 21/14 428/221 |
| 2014/0242310 A1* | 8/2014 | Guillemette | B32B 27/08 428/36.4 |

(Continued)

FOREIGN PATENT DOCUMENTS

| EP | 3 040 386 A1 | 7/2016 |
|---|---|---|
| EP | 3 064 351 A1 | 9/2016 |

(Continued)

OTHER PUBLICATIONS

Machine translation of JP2015147597A, published Aug. 2015, Powered by EPO and Google, (Year: 2015).*

(Continued)

*Primary Examiner* — Monique R Jackson
(74) *Attorney, Agent, or Firm* — Foley & Lardner LLP

(57) ABSTRACT

A gas barrier film includes: a substrate; and a gas barrier layer located on at least one surface of the substrate, the gas barrier layer containing an aqueous polyurethane resin that contains an acid group-containing polyurethane resin and a polyamine compound, a water soluble polymer, and an inorganic layered mineral, wherein, when a region from a top to a bottom of a cross-section of the gas barrier layer in a thickness direction, which is defined as a first region, is equally divided in the thickness direction into 11 strip regions, and a region different from the first region from a top to a bottom of a cross-section of the gas barrier layer in the thickness direction, which is defined as a second region.

16 Claims, 3 Drawing Sheets

(52) U.S. Cl.
CPC ............ *B32B 2264/1026* (2020.08); *B32B 2307/7244* (2013.01); *B32B 2439/00* (2013.01)

(56) References Cited

U.S. PATENT DOCUMENTS

| | | | |
|---|---|---|---|
| 2014/0363661 A1 | 12/2014 | Kaminaga et al. | |
| 2014/0370270 A1 | 12/2014 | Kaminaga et al. | |
| 2015/0232683 A1* | 8/2015 | Oto .................... | C09D 133/02 206/524.4 |
| 2015/0314941 A1* | 11/2015 | Ramadas ............. | B65D 85/38 428/326 |
| 2016/0040035 A1* | 2/2016 | Omura ............... | C08G 18/7671 428/324 |
| 2016/0160063 A1* | 6/2016 | Kaminaga ........... | C08G 18/724 524/45 |
| 2016/0237308 A1* | 8/2016 | Omura ................. | B32B 27/08 |
| 2018/0002496 A1* | 1/2018 | Rule .................... | C08G 63/183 |

FOREIGN PATENT DOCUMENTS

| | | | |
|---|---|---|---|
| JP | H06-93133 A | | 4/1994 |
| JP | H09-150484 A | | 6/1997 |
| JP | H11-165369 A | | 6/1999 |
| JP | 2001-287294 A | | 10/2001 |
| JP | 2002-321301 A | | 11/2002 |
| JP | 3780741 B2 | | 5/2006 |
| JP | 2015-085546 A | | 5/2015 |
| JP | 2015147597 A | * | 8/2015 |
| JP | 2017-226776 A | | 12/2017 |

OTHER PUBLICATIONS

Tan, A review of the water barrier properties of polymer/clay and polymer/graphene nanocomposites, 2016, Journal of Membrane Science 514, pp. 595-612. (Year: 2016).*

Tipachan, Water vapor barrier property of PLA nanocomposites using rice husk ash and layered double hydroxides as fillers, 2019, Engineering and Applied Science Research 46(4), pp. 285-291. (Year: 2019).*

Sapalidis, PVA/Montmorillonite Nanocomposites: Development and Properties, 2011, Nanocomposites and Polymers with Analytical Methods, pp. 29-50, downloaded from https://www.researchgate.net/publication/221914411. (Year: 2011).*

Adak, Effect of organoclay-type and clay-polyurethane interaction chemistry for tuning the morphology, gas barrier and mechanical properties of clay/polyurethane nanocomposites, 2018, Applied Clay Science 161, pp. 343-353. (Year: 2018).*

Diawara, Polycarbonate/mica extrusion using mixing elements: Improvement of transparency and thermal, mechanical and water and gas barrier properties, Polymer 230 (2021) 124030. (Year: 2021).*

Choudalakis, Permeability of polymer/clay nanocomposites: A review, 2009, European Polymer Journal 45, Macromolecular Nanotechnology—Review, pp. 967-984. (Year: 2009).*

Da, Studying the Influence of Mica Particle Size on the Properties of Epoxy Acrylate/Mica Composite Coatings through Reducing Mica Particle Size by the Ball-Milled Method, 2022, Coatings, 12, 98. (Year: 2022).*

Nakach, Comparison of high pressure homogenization and stirred bead milling for the production of nano-crystalline suspensions, 2018, International Journal of Pharmaceuticals 547, pp. 61-71. (Year: 2018).*

European Extended Search Report from EP 19793455.7 dated May 25, 2021 (7 pages).

International Searching Authority, "International Search Report," issued in connection with International Patent Application No. PCT/JP2019/015764, dated Jun. 4, 2019.

International Searching Authority, "Written Opinion," issued in connection with International Patent Application No. PCT/JP2019/015764, dated Jun. 4, 2019.

* cited by examiner

GAS BARRIER FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/015764, filed on Apr. 11, 2019, which is based upon and claims the benefit of priority to Japanese Patent Applications No. 2018-087687, filed on Apr. 27, 2018, the disclosures of which are all incorporated herein by reference in their entireties.

TECHNICAL FIELD

The present invention relates to gas barrier films.

BACKGROUND

Packaging materials used for packaging food products or pharmaceutical products are required to have properties (gas barrier properties) for protecting the contents from moisture, oxygen and other gases that may degrade the contents in order to protect the contents from degradation and decay and retain the functions and nature of the contents.

For this reason, packaging materials that have been conventionally used include a gas barrier layer.

Such a gas barrier layer is formed on a substrate made of a film or paper by sputtering, vapor deposition, wet coating, printing, or the like.

The gas barrier layer is made of a metal foil, a metal vapor deposition film, a resin film, a composite film, or the like (for example, see PTLs 1 to 6). Examples of the metal foil and the metal vapor deposition film include a foil or a film made of aluminum or other metals. Examples of the resin film include a film made of water-soluble polymers such as polyvinyl alcohol and ethylene-vinyl alcohol copolymer, and resins such as polyvinylidene chloride. Examples of the composite film include composite films of a water soluble polymer and an inorganic layered mineral.

CITATION LIST

[Patent Literature]
PTL 1: JP 2002-321301 A; PTL 2: JP 2001-287294 A; PTL 3: JP H11-165369 A; PTL 4: JP H6-93133 A; PTL 5: JP H9-150484 A; PTL 6: JP 3780741 B2

SUMMARY OF THE INVENTION

Technical Problem

Metal foils and metal vapor deposition films have high gas barrier properties. However, because metal foils and metal vapor deposition films are opaque, the contents are not visible. In addition, because metal foils and metal vapor deposition films have low stretchability, even a few % of elongation may cause cracking, leading to deterioration in gas barrier properties. Further, metal foils and metal vapor deposition films have various problems in that they need to be treated as incombustible materials when disposing of them after use.

Resin films made of water-soluble polymers such as polyvinyl alcohol and ethylene-vinyl alcohol copolymer exhibit high gas barrier properties in a low humidity atmosphere. However, the gas barrier properties have a humidity dependence. The gas barrier properties of resin film decrease with an increase in humidity. In particular, because the gas barrier properties are lost in a high humidity atmosphere, for example, at a humidity of 70% RH or more, usage is limited.

Resin films made of polyvinylidene chloride have low humidity dependence, and high gas barrier properties. However, because polyvinylidene chloride contains chlorine, it may generate harmful substances such as dioxins at the time of disposal.

Composite films of a water soluble polymer and an inorganic layered mineral have high transparency compared with metal foils and metal vapor deposition films. However, gas barrier properties in a high humidity atmosphere were not satisfactory, although they are higher than those of resin films made of water-soluble polymer.

The present invention has been made in view of the above circumferences, and an object of the invention is to provide a gas barrier film having high gas barrier properties even in a high humidity atmosphere.

Solution to Problem

The present invention has the following aspects.

[1] A first aspect of the present invention is a gas barrier film including: a substrate; and a gas barrier layer located on at least one surface of the substrate, the gas barrier layer containing an aqueous polyurethane resin (A) that contains an acid group-containing polyurethane resin and a polyamine compound, a water soluble polymer (B), and an inorganic layered mineral (C), wherein, when a region from a top to a bottom of a cross-section of the gas barrier layer in a thickness direction, which is defined as a first region, is equally divided in the thickness direction into 11 strip regions, and when a region different from the first region from a top to a bottom of a cross-section of the gas barrier layer in the thickness direction, which is defined as a second region, is equally divided in the thickness direction into 11 strip regions to thereby define a total of 22 strip regions; a portion having a length of 1 μm in a direction perpendicular to the thickness direction in each of second, fourth, sixth, eighth, and tenth strip regions from a first surface of the gas barrier layer among the 11 strip regions in the first region, and a portion having a length of 1 μm in a direction perpendicular to the thickness direction in each of second, fourth, sixth, eighth, and tenth strip regions from the first surface of the gas barrier layer among the 11 strip regions in the second region is each defined as a measurement target region to thereby select ten of the measurement target regions that constitute a first measurement target region group; a standard deviation of a luminance projection ($\alpha$) in the length direction is obtained in each of the ten of the measurement target regions in the first measurement target region group; and an arithmetic mean of a plurality of the standard deviations of the ten of the luminance projections ($\alpha$) in the first measurement target region group is obtained as an average, the average of the plurality of the standard deviations of the ten of the luminance projections ($\alpha$) in the first measurement target region group in the gas barrier layer is 10 or less.

[2] A difference between a maximum value and a minimum value of the standard deviations of the total of ten luminance projections ($\alpha$) may be 8 or less.

[3] When a position at a depth of 10% of the thickness of the gas barrier layer from the first surface of the gas barrier layer in a cross-section of the gas barrier layer in the thickness direction is defined as a first position, and a position at a depth of 10% of the thickness of the gas barrier layer in the direction from a first surface of the substrate toward the first surface of the gas barrier layer in a cross-section of the gas barrier layer in the thickness direction is defined as a second position; a square region having a side length from the first position to the second position is defined as a measurement target region; ten of the square regions with intervals therebetween in the length direction perpendicular to the thickness direction of the gas barrier layer are selected to define a second measurement target region group composed of the ten of the measurement target regions; a standard deviation of a luminance projection (β) in the length direction is obtained in each of the ten of the measurement target regions in the second measurement target region group; and an arithmetic mean of a plurality of the standard deviations of the ten of the luminance projections (β) in the second measurement target region group is obtained as an average, the average of the plurality of the standard deviations of the ten of the luminance projections (β) in the second measurement target region group in the gas barrier layer is 2.90 or less.

[4] A difference between a maximum value and a minimum value of the standard deviations of the total of ten luminance projections (β) may be 3.0 or less.

[5] A content of the water soluble polymer (B) to a total mass of the gas barrier layer is in a range of 25 to 80 mass %, and a content of the inorganic layered mineral (C) to a total mass of the gas barrier layer may be in a range of 3 to 20 mass %.

[6] An adhesive layer and a sealant layer may also be provided in this order on the first surface of the gas barrier layer.

Advantageous Effects of Invention

The gas barrier film according to the present invention has high gas barrier properties even in a high humidity atmosphere.

DETAILED DESCRIPTION

Embodiments of the present invention of an optical film and an optical barrier film will be described below with reference to the drawings. In the following description of the drawings to be referred, components identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

Figure 1:
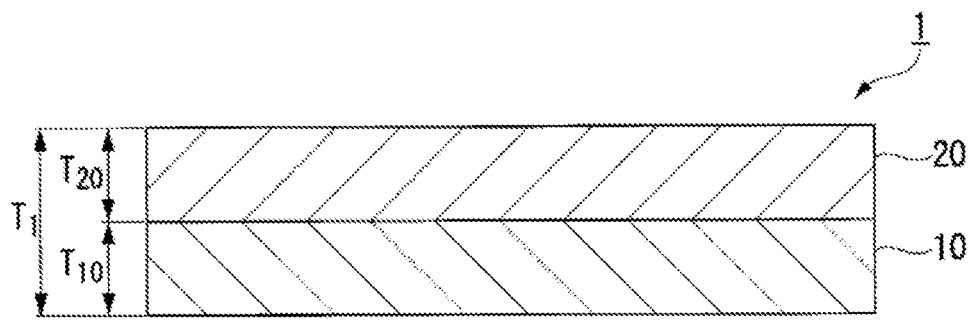
FIG. 1 is a cross-sectional view of a gas barrier film according to an embodiment of the present invention.

Referring to FIG. 1, a gas barrier film according to an embodiment of the present invention will be described.

It should be noted that the present embodiment is described in detail to facilitate better understanding of the gist of the invention, and should not limit the present invention unless otherwise specified.

For example, a gas barrier film according to the present embodiment includes: a substrate; and a gas barrier layer located on at least one surface of the substrate, the gas barrier layer containing an aqueous polyurethane resin (A) that contains an acid group-containing polyurethane resin and a polyamine compound, a water soluble polymer (B), and an inorganic layered mineral (C), wherein, when a region from a top to a bottom of a cross-section of the gas barrier layer in a thickness direction, which is defined as a first region, is equally divided in the thickness direction into 11 strip regions, and when a region different from the first region from a top to a bottom of a cross-section of the gas barrier layer in the thickness direction, which is defined as a second region, is equally divided in the thickness direction into 11 strip regions to thereby define a total of 22 strip regions; a portion having a length of 1 μm in a direction perpendicular to the thickness direction in each of second, fourth, sixth, eighth, and tenth strip regions from a first surface of the gas barrier layer among the 11 strip regions in the first region, and a portion having a length of 1 μm in a direction perpendicular to the thickness direction in each of second, fourth, sixth, eighth, and tenth strip regions from the first surface of the gas barrier layer among the 11 strip regions in the second region is each defined as a measurement target region to thereby select ten of the measurement target regions that constitute a first measurement target region group; a standard deviation of a luminance projection (α) in the length direction is obtained in each of the ten of the measurement target regions in the first measurement target region group; and an arithmetic mean of a plurality of the standard deviations of the ten of the luminance projections (α) in the first measurement target region group is obtained as an average, the average of the plurality of the standard deviations of the ten of the luminance projections (α) in the first measurement target region group in the gas barrier layer is 10 or less.

The gas barrier film according to the present embodiment will be described in detail.

As shown in FIG. 1, a gas barrier film 1 according to the present embodiment includes a substrate 10, and a gas barrier layer 20 located on one surface of the substrate 10. The substrate 10 is made of a plastic material.

The gas barrier film 1 has a thickness $T_1$. Although not specifically limited, the thickness $T_1$ is preferably in a range of 3.1 μm to 205 μm, more preferably 5.2 μm to 122 μm, and still more preferably 10.3 μm to 101 μm. When the thickness $T_1$ is the lower limit (3.1 μm) or more, the strength of the gas barrier film 1 tends to be more improved. When the thickness $T_1$ is the upper limit (205 μm) or less, the gas barrier film 1 tends to be more flexible, which increases handling of the gas barrier film 1.

Examples of plastic materials for forming the substrate 10 include olefin-based resins such as polyethylene, polypropylene, olefin polymers having a carbon number of 2 to 10, and propylene-ethylene copolymers; polyester-based resins such as polyethylene terephthalate, and polybutylene terephthalate; polyamide-based resins such as aliphatic polyamides such as Nylon 6 and Nylon 66, and aromatic polyamides such as polymetaxylylene adipamide; vinyl-based resin such as polystyrene, polyvinyl acetate, ethylene-vinyl acetate copolymer, polyvinyl alcohol, and ethylene-vinyl alcohol copolymer; acrylic resins such as homopolymers and copolymers of (meth)acrylic monomers such as polymethylmethacrylate, and polyacrylonitrile; and cellophane. These resins can be used singly or in combination of two or more.

The substrate 10 may be a single layer film made of a single resin, or a laminated film made of a plurality of resins. Further, a laminated substrate may also be used in which the above resins are laminated on another substrate (metal, wood, paper, ceramics, etc.).

The substrate 10 is preferably a polyolefin-based resin film (in particular, polypropylene film or the like), polyester-based resin film (in particular, polyethylene terephthalate-based resin film), polyamide-based resin film (in particular, Nylon film), or the like.

The substrate 10 may be an unstretched film, or may be a uniaxially or biaxially oriented film.

A surface of the substrate 10 on which a film made of a coating agent is laminated (a surface coated with a coating agent) may be subjected to a surface treatment such as corona treatment, low temperature plasma treatment, or the like in order to improve wettability to a coating agent and adhesion strength to the coating film.

The surface of the substrate 10 on which a film made of a coating agent is laminated may also be subjected to an anchor coat or undercoat treatment.

The substrate 10 has a thickness $T_{10}$. The thickness $T_{10}$ is not specifically limited, and is appropriately selected depending on the price and application, taking into consideration the suitability as a packaging material and suitability for lamination of other coating films. Practically, the thickness $T_{10}$ is preferably in a range of 3 μm to 200 μm, more preferably 5 μm to 120 μm, and still more preferably 10 μm to 100 μm.

The gas barrier layer 20 is located on one surface of the substrate 10. The gas barrier layer 20 is a layer made of a specific coating agent. The coating agent contains an aqueous polyurethane resin (A), a water soluble polymer (B), and an inorganic layered mineral (C). That is, the gas barrier layer 20 contains the aqueous polyurethane resin (A), the water soluble polymer (B), and the inorganic layered mineral (C). The aqueous polyurethane resin (A) contains an acid group-containing polyurethane resin, and a polyamine compound.

The gas barrier layer 20 has a thickness $T_{20}$, which is set according to the required gas barrier properties. The thickness $T_{20}$ is preferably in a range of 0.1 μm to 5 μm, more preferably 0.2 μm to 2 μm, and still more preferably 0.3 μm to 1 μm. When the thickness $T_{20}$ is the lower limit (0.1 μm) or more, sufficient gas barrier properties tend to be obtained. When the thickness $T_{20}$ is the upper limit (5 μm) or less, a uniform coating film surface can be easily formed, and a drying load and manufacturing cost can be reduced.

The thickness of the gas barrier layer 20 is measured by a scanning electron microscope (SEM).

Each components of the gas barrier layer 20 will be described below.

[Aqueous Polyurethane Resin (A)]

The aqueous polyurethane resin (A) contains an acid group-containing polyurethane resin, and a polyamine compound.

The aqueous polyurethane resin (A) is used to impart flexibility and gas barrier properties, in particular, oxygen barrier properties, to the gas barrier layer 20. The aqueous polyurethane resin (A) exhibits gas barrier properties due to a bond between an acid group of the acid group-containing polyurethane resin and a polyamine compound as a cross-linking agent.

The bond between an acid group of the acid group-containing polyurethane resin and a polyamine compound may be an ionic bond (for example, an ionic bond between a carboxyl group and a tertiary amino group), or may be a covalent bond (for example, an amide bond or the like).

The acid group-containing polyurethane resin constituting the aqueous polyurethane resin (A) is anionic and self-emulsifying because it has an acid group, and thus it is also called an anionic self emulsifying polyurethane resin.

The acid group may be a carboxyl group, sulfonic acid group, or the like. The acid group may be located at the terminal or side chain of the polyurethane resin, and preferably located at the side chain. The acid group can be usually neutralized by a neutralizer (base), and may form a salt with a base. Further, the acid group can be bonded to an amino group (imino group or tertiary nitrogen atom) constituting the aqueous polyurethane resin (A).

An acid value of the acid group-containing polyurethane resin can be selected within a range capable of imparting water solubility or water dispersibility. The acid value of the acid group-containing polyurethane resin is preferably in a range of 5 to 100 mgKOH/g, more preferably 10 to 70 mgKOH/g, and still more preferably 15 to 60 mgKOH/g. When the acid value of the acid group-containing polyurethane resin is the lower limit (5 mgKOH/g) or more, homogeneous dispersibility between the aqueous polyurethane resin (A) and other materials and dispersion stability of coating agents tend to be improved. When the acid value of the acid group-containing polyurethane resin is the upper limit (100 mgKOH/g) or less, deterioration in gas barrier properties tends to be prevented.

The acid value of the acid group-containing polyurethane resin is measured by a method according to JIS K0070.

The sum (total concentration) of the urethane group concentration and the urea group concentration of the acid group-containing polyurethane resin is preferably 15 mass % or more, and more preferably in a range of 20 to 60 mass % from the viewpoint of gas barrier properties. When the total concentration is the lower limit (15 mass %) or more, gas barrier properties tend to be improved. When the total concentration is the upper limit (60 mass %) or less, the gas barrier layer 20 tends to be prevented from becoming rigid and brittle.

Further, the urethane group concentration refers to a ratio of the molecular weight of the urethane group (59 g/equivalent) to the molecular weight of the constituent repeating unit of the polyurethane resin. The urea group concentration refers to a ratio of the molecular weight of the urea group (primary amino group (amino group): 58 g/equivalent, secondary amino group (imino group): 57 g/equivalent) to the molecular weight of the constituent repeating unit of the polyurethane resin.

When a mixture is used as the polyurethane resin, the urethane group concentration and the urea group concentration can be calculated on the basis of the blending ratio of the respective components, that is, on the basis of the respective components used.

The acid group-containing polyurethane resin preferably has at least rigid units (units composed of a hydrocarbon ring) and short chain units (for example, units composed of a hydrocarbon chain). That is, a constituent repeating unit of the acid group-containing polyurethane resin preferably includes a hydrocarbon ring (at least one of aromatic and non-aromatic hydrocarbon rings) derived from polyisocyanate component, polyhydroxy acid component, polyol component, chain extender component (in particular, at least polyisocyanate component), or the like.

The ratio of the units composed of a hydrocarbon ring to the constituent repeating units of the acid group-containing polyurethane resin is preferably in a range of 10 to 70 mass %, more preferably 15 to 65 mass %, and still more preferably 20 to 60 mass %. When the ratio of the units composed of a hydrocarbon ring is the lower limit (10 mass %) or more, deterioration in gas barrier properties tends to be prevented. When the ratio of the units composed of a hydrocarbon ring is the upper limit (70 mass %) or less, the gas barrier layer 20 tends to be prevented from becoming rigid and brittle.

A number average molecular weight of the acid group-containing polyurethane resin is appropriately selectable, and is preferably in a range of 800 to 1,000,000, more preferably 800 to 200,000, and still more preferably 800 to 100,000. When the number average molecular weight of the acid group-containing polyurethane resin is the lower limit (800) or more, deterioration in gas barrier properties tends to be prevented. When the number average molecular weight of the acid group-containing polyurethane resin is the upper limit (1,000,000) or less, an increase in viscosity of the coating agent tends to be prevented.

The number average molecular weight of the acid group-containing polyurethane resin is a value measured by gel permeation chromatography (GPC) relative to a polystyrene standard.

The acid group-containing polyurethane resin may be crystalline in order to enhance gas barrier properties.

A glass transition temperature of the acid group-containing polyurethane resin is preferably in a range of 100 to 200° C., more preferably 110 to 180° C., and still more preferably 120 to 150° C. When the glass transition temperature of the acid group-containing polyurethane resin is the lower limit (100° C.) or more, deterioration in gas barrier properties tends to be prevented. The glass transition temperature of the acid group-containing polyurethane resin is typically the upper limit (200° C.) or less.

The glass transition temperature of the acid group-containing polyurethane resin is measured by differential scanning calorimetry (DSC).

The aqueous polyurethane resin (A) includes a neutralizer, and is preferably formed with the acid group-containing polyurethane resin being dissolved or dispersed in an aqueous medium.

The aqueous medium may be water, a water-soluble solvent, a hydrophilic solvent, or a mixed solvent thereof, and is preferably water or a water-soluble solvent containing water as a main component.

Examples of the hydrophilic solvent include alcohols such as ethanol and isopropanol; ketones such as acetone and methyl ethyl ketone; ethers such as tetrahydrofuran; cellosolves; carbitols; and nitriles such as acetonitrile.

The aqueous polyurethane resin (A) may be in either the form of an aqueous solution obtained by dissolving the acid group-containing polyurethane resin in an aqueous medium, or an aqueous dispersion obtained by dispersing the acid group-containing polyurethane resin in an aqueous medium.

An average particle size of dispersion particles (polyurethane resin particles) in the aqueous dispersion is preferably, but not limited to, in a range of 20 to 500 nm, more preferably 25 to 300 nm, and still more preferably 30 to 200 nm. When the average particle size of dispersion particles is the lower limit (20 nm) or more, gas barrier properties tend to be improved. When the average particle size of dispersion particles is the upper limit (500 nm) or less, deterioration in homogeneous dispersibility between the dispersion particles and other materials and in dispersion stability of coating agents tend to be prevented, and deterioration in gas barrier properties tends to be prevented.

The average particle size of dispersion particles is a value measured by a concentrated system particle size analyzer (FPAR-10, manufactured by Otsuka Electronics Co., Ltd.) when the solid content concentration is in a range of 0.03 to 0.3 mass % (diluted with water).

The aqueous polyurethane resin (A) exhibits gas barrier properties due to a bond between a polyamine compound as a crosslinking agent and an acid group of the acid group-containing polyurethane resin.

The bond between the polyamine compound and the acid group of the polyurethane resin may be an ionic bond (for example, an ionic bond between a tertiary amino group and a carboxyl group), or may be a covalent bond (for example, an amide bond or the like).

Therefore, various polyamines having two or more basic nitrogen atoms selected from the group consisting of a primary amino group, a secondary amino group, and a tertiary amino group are used as the polyamine compound.

The polyamine compound constituting the aqueous polyurethane resin (A) is not specifically limited, and various compounds that can be bonded to an acid group, and improve gas barrier properties, can be used.

Specific examples of the polyamine compound include alkylene diamines, polyalkylene polyamines, silicon compounds having a plurality of basic nitrogen atoms, and the like. Examples of the alkylene diamines include alkylene diamines having a carbon number of 2 to 10, such as ethylene diamine, 1,2-propylene diamine, 1,3-propylene diamine, 1,4-butane diamine, and 1,6-hexamethylene diamine. Examples of the polyalkylene polyamines include tetraalkylene polyamines. Examples of the silicon compounds having a plurality of basic nitrogen atoms (including nitrogen atoms of amino groups and the like) include silane coupling agents having a plurality of basic nitrogen atoms, such as 2-[N-(2-aminoethyl)amino]ethyl trimethoxysilane, and 3-[N-(2-aminoethyl)amino]propyl triethoxysilane.

The amine value of the polyamine compound is preferably in a range of 100 to 1900 mgKOH/g, more preferably 150 to 1900 mgKOH/g, still more preferably 200 to 1900 mgKOH/g, particularly preferably 200 to 1700 mgKOH/g, and most preferably 300 to 1500 mgKOH/g. When the amine value of the polyamine compound is the lower limit (100 mgKOH/g) or more, gas barrier properties tend to be improved. When the amine value of the polyamine compound is the upper limit (1900 mgKOH/g) or less, water dispersion stability of the aqueous polyurethane resin (A) is improved.

The amine value of the polyamine compound is measured by the following method.

A precise weighing is performed for 0.5 to 2 g of a sample (sample amount S g). The precisely weighed sample is mixed with 30 g of ethanol, and dissolved therein. Bromophenol blue was added as an indicator to the solution obtained above to perform titration with 0.2 mol/L of ethanol-hydrochloric acid solution (titer f). A point where the color of solution changes to a color between green and yellow is set as an end point, and a titer amount (AmL) at the end point is measured to calculate an amine value by using the following calculation formula 1.

amine value=$A \times f \times 0.2 \times 56.108/S$ [mgKOH/g]   Calculation formula 1:

In the aqueous polyurethane resin (A), the content of the polyamine compound preferably has a molar ratio between the acid group of the acid group-containing polyurethane resin and the basic nitrogen atom of the polyamine compound (acid group/basic nitrogen atom) in a range of 10/1 to 0.1/1, and more preferably 5/1 to 0.2/1. When the acid group/basic nitrogen atom ratio is in the above numerical range (10/1 to 0.1/1), crosslinking reaction between the acid group of the acid group-containing polyurethane and the polyamine compound appropriately occurs so that the gas barrier layer 20 exhibits high oxygen barrier properties.

The aqueous polyurethane resin (A) may be a resin that is commercially available, or may be a resin manufactured by a known manufacturing method.

The manufacturing method of the aqueous polyurethane resin (A) is not specifically limited, and common aqueous methods for polyurethane resin, such as an acetone method and a prepolymer method, may be used. In an urethanization reaction, urethanization catalysts such as amine-based catalysts, tin-based catalysts, and lead-based catalysts may be used as appropriate.

For example, the aqueous polyurethane resin (A) can be prepared by reacting a polyisocyanate compound, a polyhydroxy acid, and at least one of a polyol component and a chain extender component in an inert organic solvent such as ketones such as acetone, ethers such as tetrahydrofuran, or nitriles such as acetonitrile. More specifically, the aqueous polyurethane resin (A) can be prepared by reacting a polyisocyanate compound, a polyhydroxy acid, and a polyol component in an inert organic solvent (in particular, hydrophilic or water-soluble organic solvent) to generate a prepolymer having an isocyanate group at the terminal, followed by neutralization by using a neutralizer for dissolution or dispersion into an aqueous medium, reaction with a chain extender component added thereto, and removal of the organic solvent.

[Water Soluble Polymer (B)]

The "water soluble polymer" refers to a polymer that is soluble in water. The term "soluble" as used herein refers to a state in which polymers are dispersed at molecular chain level as a solute in water, which is a solvent, to form a homogeneous system. More specifically, it refers to a state in which an intermolecular force between a polymer and a water molecule is stronger than that between polymer chains such that polymer chains are disentangled and polymers are homogeneously dispersed in water.

The polymers described herein refer to compounds having a mass average molecular weight of 10,000 or more. The mass average molecular weight is measured by GPC, using polystyrene as a standard substance.

The water soluble polymer (B) is not specifically limited as long as it can be inserted or coordinated (intercalated) between the unit crystal layers of the inorganic layered mineral (C), which will be described later.

Specific examples of the water soluble polymer (B) include polyvinyl alcohol resins such as polyvinyl alcohol and derivatives of polyvinyl alcohol; vinyl-based polymers such as polyvinyl pyrrolidone, polyacrylic acid, polymethacrylic acid or esters and salts thereof, and copolymers thereof, and polyhydroxyethylmethacrylate and copolymers thereof; cellulose derivatives such as carboxymethyl cellulose, and hydroxyethyl cellulose; starches such as oxidized starch, etherified starch, and dextrin; copolymerized polyesters containing polar groups such as sulfoisophthalic acid; and urethane-based polymers excluding the aqueous polyurethane resin (A), or functional group-modified polymers with a modified carboxyl group or the like of the various polymers.

In consideration of the film cohesive strength, the degree of polymerization of the water soluble polymer (B) is preferably 200 or more.

The water soluble polymer (B) contained in the coating agent may be one or more types.

The water soluble polymer (B) preferably contains at least one polyvinyl alcohol resin selected from the group consisting of at least polyvinyl alcohol-based polymer and derivatives of polyvinyl alcohol-based polymer, and more preferably contains a polyvinyl alcohol resin having a saponification degree of 95% or more and polymerization degree of 300 or more. The polymerization degree of the polyvinyl alcohol resin is preferably in a range of 300 to 2400, and more preferably 450 to 2000.

The polyvinyl alcohol resin has lower hygroscopic and swellable properties with an increase in saponification degree and polymerization degree. When the saponification degree of the polyvinyl alcohol resin is less than 95%, or the polymerization degree of the polyvinyl alcohol resin is less than 300, sufficient gas barrier properties may not be obtained. When the polymerization degree of the polyvinyl alcohol resin is more than 2400, the viscosity of the coating agent increases. This makes it difficult to homogeneously mix with other components, leading to problems such as deterioration in gas barrier properties and decrease in adhesion strength.

[Inorganic Layered Mineral (C)]

The "inorganic layered mineral" refers to an inorganic compound in which extremely thin (for example, 10 to 500 nm thickness) unit crystal layers are layered to form a single layered particle. The inorganic layered mineral (C) is used to further enhance gas barrier properties of the gas barrier layer 20.

The inorganic layered mineral (C) is preferably a compound having one or both of swellable properties and cleavage properties in water. Among these compounds, a clay compound having water-swellable properties is particularly preferred. More preferably, the inorganic layered mineral (C) is preferably a clay compound in which water is coordinated between extremely thin unit crystal layers, and has one or both of absorption and swellable properties. In general, the clay compound is a compound having a layered structure made up of layers having a tetrahedral structure in which $Si^{4+}$ is coordinated with $O^{2-}$, and layers having an octahedral structure in which $Al^{3+}$, $Mg^{2+}$, $Fe^{2+}$, $Fe^{3+}$, or the like are coordinated with $O^{2-}$ and $OH^-$, which are bonded at 1:1 or 2:1 and built up. The clay compound may be a natural compound or a synthetic compound.

Typical examples of the inorganic layered mineral (C) include hydrous silicates such as phyllosilicate minerals, and include, for example, kaolinite clay minerals such as halloysite, kaolinite, endellite, dickite and nacrite; antigorite clay minerals such as antigorite and chrysotile; smectite clay minerals such as montmorillonite, beidellite, nontronite, saponite, hectorite, sauconite and stevensite; vermiculite clay minerals such as vermiculite; micas or mica clay minerals such as white mica, bronze mica, margarite, tetrasilicic mica, and taeniolite. These inorganic layered minerals (C) are used singly or in combination of two or more.

Of these inorganic layered minerals (C), smectite clay minerals such as montmorillonite or mica clay minerals such as water-swellable mica are particularly preferred.

The inorganic layered mineral (C) preferably has an average particle size of 10 μm or less, and a thickness of 500 nm or less. When each of the average particle size and the thickness are the upper limit or less (the average particle size of 10 μm or less, and the thickness of 500 nm or less), the inorganic layered minerals (C) tend to be uniformly arranged in the gas barrier layer 20 made of the coating agent to thereby increase gas barrier properties and film cohesive strength.

The average particle size of the inorganic layered mineral (C) is measured by a laser diffraction particle size analyzer.

The thickness of the inorganic layered mineral (C) is measured by an atomic force microscope (AFM).

The inorganic layered mineral (C) preferably includes at least water-swellable synthetic mica. For example, the average particle size of the water-swellable synthetic mica is preferably in a range of 1 to 10 and more preferably 3 to 8 When the average particle size of the water-swellable synthetic mica is the lower limit (1 μm) or more, gas barrier properties tend to be improved. When the average particle size of the water-swellable synthetic mica is the upper limit (10 μm) or less, uniform arrangement in the gas barrier layer 20 is facilitated.

For example, the thickness of the water-swellable synthetic mica is preferably in a range of 10 to 100 nm, and more preferably 10 to 80 nm. When the thickness of the water-swellable synthetic mica is the lower limit (10 nm) or more, gas barrier properties tend to be improved. When the thickness of the water-swellable synthetic mica is the upper limit (100 nm) or less, uniform arrangement in the gas barrier layer 20 is facilitated.

Water-swellable synthetic mica has high miscibility with the aqueous polyurethane resin (A) and the water soluble polymer (B), and has less impurities compared with natural mica. Accordingly, when the water-swellable synthetic mica is used as the inorganic layered mineral (C), deterioration in gas barrier properties and decrease in film cohesive force due to impurities tend to be prevented.

Further, because the water-swellable synthetic mica contains fluorine atoms in the crystal structure, it also contributes to minimization of humidity dependence of the gas barrier properties of the gas barrier layer 20 made of the coating agent.

In addition, because the water-swellable synthetic mica has a high aspect ratio compared with other types of water-swellable inorganic layered minerals, a labyrinth effect can be more effectively performed, which particularly contributes to gas barrier properties of the gas barrier layer 20 made of the coating agent.

For example, the content of the water-swellable synthetic mica to the total mass of the inorganic layered mineral (C) is preferably 50 mass % or more, more preferably 70 mass % or more, and may be 100 mass % or more.

[Optional Components]

The gas barrier layer 20 may further include optional components in addition to the aqueous polyurethane resin (A), the water soluble polymer (B), and the inorganic layered mineral (C) to an extent that does not hinder the advantageous effect of the present invention.

Examples of the optional components include additives such as antioxidants, weather-resistant agents, thermostabilizers, lubricants, nucleating agents, UV absorbers, plasticizers, antistatic agents, colorants, fillers, and surfactants.

In the coating agent constituting the gas barrier layer 20, the mass ratio of the aqueous polyurethane resin (A) and the water soluble polymer (B) in solid content (hereinafter, also referred to as a (A)/(B) ratio) is preferably in a range of 85/15 to 10/90, more preferably 75/25 to 20/80, and still more preferably 70/30 to 25/75.

When the (A)/(B) ratio is in the above numerical range (85/15 to 10/90), the coating agent can be uniformly applied to thereby form the gas barrier layer 20 having high gas barrier properties and flexibility. When the content of the aqueous polyurethane resin (A) is larger than that in the (A)/(B) ratio of 85/15, unevenness may occur during coating. Unevenness during coating leads to deterioration in appearance and in gas barrier properties. When the content of the aqueous polyurethane resin (A) is smaller than that in the (A)/(B) ratio of 10/90, oxygen barrier properties may be insufficient.

The content of the water soluble polymer (B) contained in the gas barrier layer 20 to the total mass of the gas barrier layer 20 is preferably in a range of 25 to 80 mass %, more preferably 30 to 75 mass %, and still more preferably 35 to 70 mass %. When the content of the water soluble polymer (B) is the lower limit (25 mass %) or more, the inorganic layered mineral (C) can be easily dispersed. When the content of the water soluble polymer (B) is the upper limit (80 mass %) or less, the inorganic layered mineral (C) can be more homogeneously dispersed.

The content of the inorganic layered mineral (C) contained in the gas barrier layer 20 to the total mass of the gas barrier layer 20 is preferably in a range of 3 to 20 mass %, more preferably 5 to 16 mass %, and still more preferably 7 to 12 mass %. When the content of the inorganic layered mineral (C) is the lower limit (3 mass %) or more, gas barrier properties of the gas barrier layer 20 tend to be improved. When the content of the inorganic layered mineral (C) is the upper limit (20 mass %) or less, flexibility of the gas barrier layer 20 tend to be improved.

In the coating agent constituting the gas barrier layer 20, the total content (solid content) of the aqueous polyurethane resin (A), the water soluble polymer (B), and the inorganic layered mineral (C) to the total solid content in the coating agent is preferably 85 mass % or more, more preferably 90 mass % or more, and still more preferably 95 mass %. The upper limit of this total content is not specifically limited, and may also be 100 mass %.

The gas barrier layer 20 can be formed on one or both surfaces of the substrate 10 by applying a coating agent to form a coating film, and drying the coating film (removing an aqueous medium).

The coating agent can be applied by using a known wet coating method. Examples of the wet coating method include roll coating, gravure coating, reverse coating, die coating, screen printing, spray coating and the like.

The coating film made of the coating agent is dried by a known drying method such as hot-air drying, heat roll drying, or infrared radiation. The drying temperature of the coating film is preferably in a range of 50 to 200° C., for example. The drying time varies depending on the thickness of the coating film, the drying temperature, and the like, but is preferably in a range of 1 second to 5 minutes, for example.

In the gas barrier layer 20, the average of the standard deviations of the luminance projections (α), measured by the following Measurement method 1, is 10 or less.

<Measurement Method 1>

In the cross-section of the gas barrier layer in the thickness direction, two regions are each equally divided in the thickness direction into 11 pieces to define 11 strip regions. In each of second, fourth, sixth, eighth, and tenth strip regions from a first surface of the gas barrier layer 20 among these 11 strip regions, a portion having a length of 1 μm in a direction perpendicular to the thickness direction is defined as a measurement target region. In the respective measurement target regions, a standard deviation of a luminance projection (α) in the length direction is obtained, and an arithmetic mean of a total of ten standard deviations of the luminance projections (α) is obtained as an average.

In other words, Measurement method 1 in the gas barrier film according to the present embodiment is a method in which: when a region from the top to the bottom of the cross-section of the gas barrier layer 20 in the thickness direction, which is defined as a first region S1, is equally divided in the thickness direction into 11 strip regions A1 to A11, and a region different from the first region from the top to the bottom of the cross-section of the gas barrier layer 20 in the thickness direction, which is defined as a second region S2, is equally divided in the thickness direction into 11 strip regions B1 to B11 to thereby define a total of 22 strip regions A1 to A11 and B1 to B11; a portion having a length of 1 μm in the length direction perpendicular to the thickness direction in each of second, fourth, sixth, eighth, and tenth strip regions A2, A4, A6, A8, and A10, respectively, from the first surface of the gas barrier layer 20 among the 11 strip regions A1 to A11 in the first region S1, and in each of second, fourth, sixth, eighth, and tenth strip regions B2, B4, B6, B8, and B10, respectively, from the first surface of the gas barrier layer 20 among the 11 strip regions B1 to B11 in the second region S2 is each defined as a measurement target region to thereby select ten measurement target regions A2, A4, A6, A8, A10, B2, B4, B6, B8, and B10 that constitute a first measurement target region group; and a standard deviation of a luminance projection (α) in the length direction is obtained in each of the ten measurement target regions A2, A4, A6, A8, A10, B2, B4, B6, B8, and B10 in the first measurement target region group, an arithmetic mean of a plurality of the standard deviations of the ten of the luminance projections (α) in the first measurement target region group composed of A2, A4, A6, A8, A10, B2, B4, B6, B8, and B10 is obtained as an average.

Figure 2:
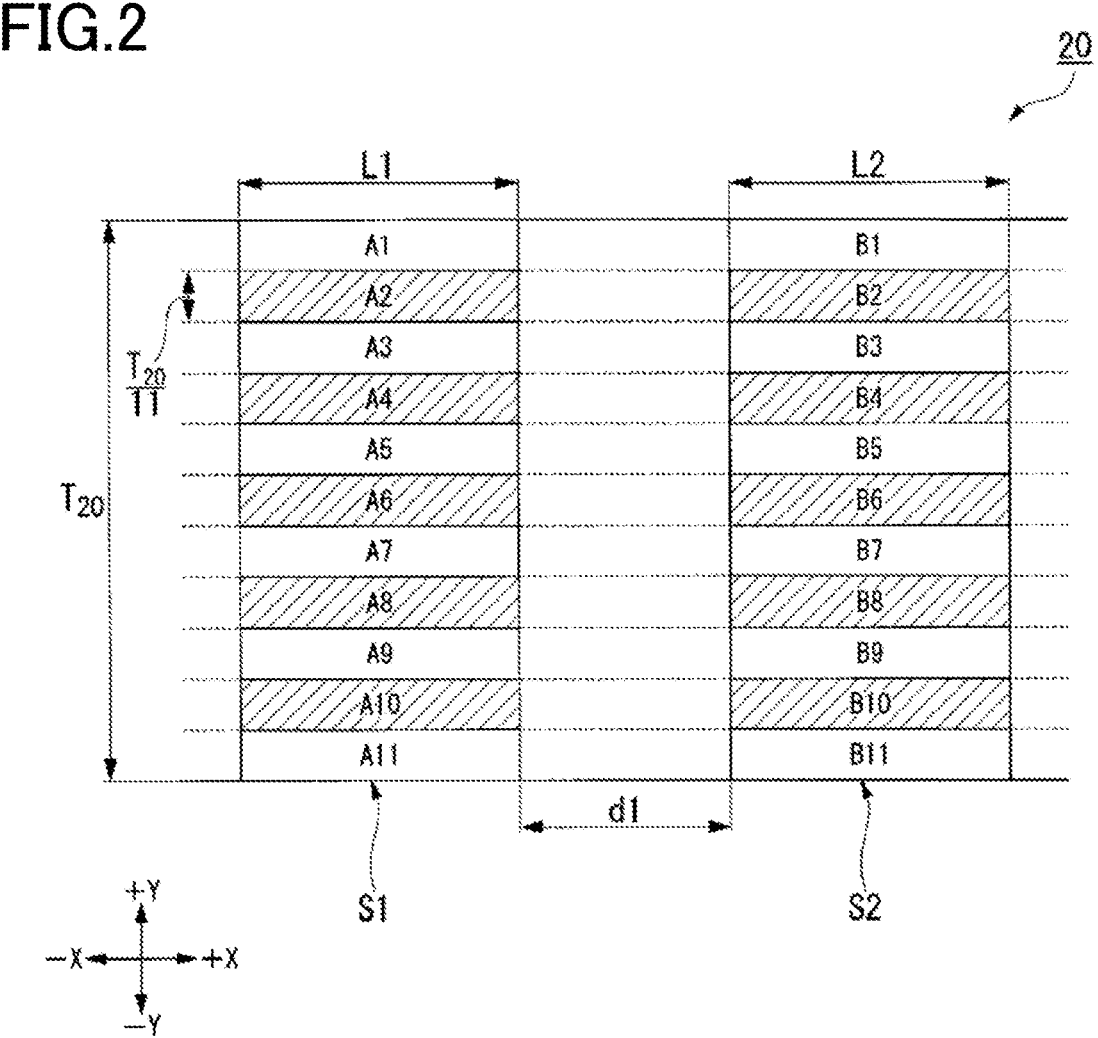
FIG. 2 is a conceptual diagram illustrating a measurement target region in Measurement method 1.

Referring to FIG. 2, Measurement method 1 is described below.

FIG. 2 is a conceptual diagram illustrating a cross section of the gas barrier layer 20 in the gas barrier film 1. In FIG. 2, the ±X direction is a length direction of the gas barrier layer 20, and the ±Y direction is a thickness direction of the gas barrier layer 20. The substrate 10 is located on the −Y side. The first surface of the gas barrier layer 20 is located on the +Y side.

A rectangular region shown in FIG. 2 with a length L1 as a horizontal side and the thickness Tao as a vertical side is defined as the first region S1. A rectangular region shown in FIG. 2 with a length L2 as a horizontal side and the thickness $T_{20}$ as a vertical side is defined as the second region S2. The first region S1 and the second region S2 are spaced from each other in the ±X direction by a distance d1. The first region S1 and the second region S2 can be freely selected. The distance d1 is not specifically limited, and is preferably in a range of 0.1 to 10 μm, for example.

The first region S1 is equally divided in the ±Y direction into 11 strip regions A1 to A11. The length of each strip regions A1 to A11 in the ±Y direction is $T_{20}/11$. The second strip region A2, fourth strip region A4, sixth strip region A6, eighth strip region A8, and tenth strip region A10 from the first surface of the gas barrier layer 20 are defined as measurement target regions. L1 is 1 μm.

Similarly to the first region S1, the second region S2 is equally divided in the ±Y direction into 11 strip regions B1 to B11. The length of each strip regions B1 to B11 in the ±Y direction is $T_{20}/11$. The second strip region B2, fourth strip region B4, sixth strip region B6, eighth strip region B8, and tenth strip region B10 from the first surface of the gas barrier layer 20 are defined as measurement target regions. L2 is 1 μm.

In each measurement target region, the luminance in the ±Y direction is measured at predetermined intervals in the ±X direction. The luminance measurements are plotted on a plane with the ±X direction as the horizontal axis and the luminance as the vertical axis. A graph of a curve connecting the plots is referred to as a luminance projection. The luminance projection measured by the above Measurement method 1 is referred to as a luminance projection (α). The predetermined interval may be, for example, 0.1 to 10 nm, and is preferably 1 nm. In the respective measurement target regions A2, A4, A6, A8, A10, B2, B4, B6, B8, and B10, a standard deviation of the luminance projection (α) is obtained, and an arithmetic mean of a total of ten standard deviations of the luminance projections (α) is obtained as an average.

The ten measurement target regions A2, A4, A6, A8, A10, B2, B4, B6, B8, and B10 may also be collectively referred to as a first measurement target region group.

The following describes how the luminance projection (α) is obtained.

The cross-section of the gas barrier layer 20 in the thickness direction is observed by a scanning electron microscope.

Figure 4:
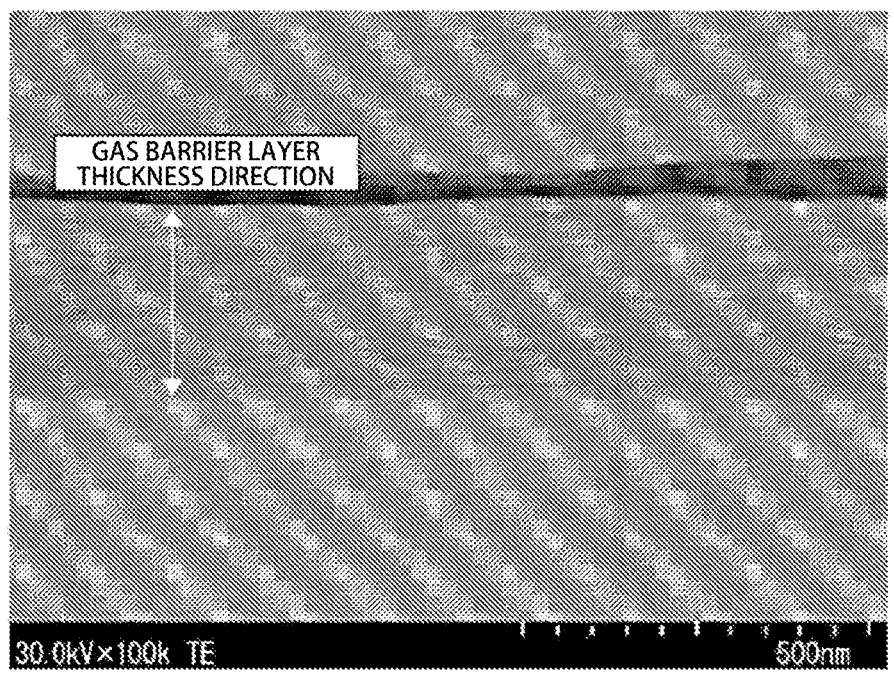
FIG. 4 is an image of a cross-section of a gas barrier film according to Example 1.

FIG. 4 is an image of the cross-section of the gas barrier film according to Example 1 described later. As shown in FIG. 4, the magnification of the scanning electron microscope for cross-sectional observation is preferably one at which an observation image that allows observation of respective layers of the inorganic layered mineral (C) can be obtained, and is more preferably 50,000 or more.

An observation image used for image processing and surface analysis, described later, is required to show the entire thickness of the gas barrier layer 20, and the observation image preferably shows 70% or more of the thickness of the gas barrier film 1.

The observation image is subjected to image processing for classification using 256 shades of grayscale. The grayscale is a technique for expressing an image only by gradation from light to dark, ranging from white to black. In this specification, values for 256 levels of lightness are referred to as luminance (gray values). Such image processing and surface analysis can be performed by using general-purpose image analysis software (hereinafter, also referred to as image processing software). Examples of the image analysis software include WinROOF (registered trademark) by Mitani Corporation, Adobe PhotoShop (registered trademark) by Adobe Systems Inc., and Scion ImageJ by Scion Corporation.

After the image processing in grayscale is applied to the observation image, the measurement target regions are selected, and the total luminance of the areas of the respective measurement target regions is averaged. The luminance is preferably averaged by adjusting lightness so that the average in the luminance histogram becomes equal to a median value of the luminance. By averaging the luminance of the observation image, variation in average luminance depending on the observation conditions for the scanning transmission electron microscopes can be standardized. In the above ten measurement target regions (first measurement target region group), the standard deviation of the luminance projection (α) in the length direction of the respective measurement target regions can be obtained by using an image processing software.

Figure 6:
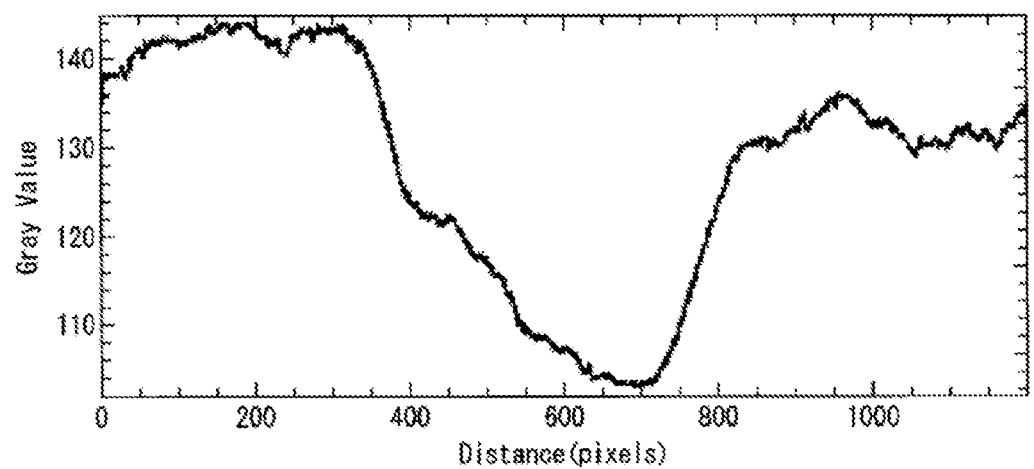
FIG. 6 is a graph showing an example of a luminance projection (α) of Measurement method 1.

FIG. 6 is a graph showing an example of the luminance projection (α) of Measurement method 1. In the graph of the luminance projection (α), the horizontal axis represents the distance in the length direction, and the vertical axis represents the gray value (degree of luminance) expressed by grayscale. As seen from FIG. 6 showing the luminance projection (α) in the length direction of the respective measurement target regions, the luminance varies depending on the position in the length direction. The standard deviation of the luminance projection (α) is an index indicating the variation in luminance. A small standard deviation of the luminance projection (α) means small variation in luminance. The standard deviation of the luminance projection (α) of FIG. 6 is 14.3.

The average of the standard deviations of the luminance projection (α) in the gas barrier layer 20 is preferably 10 or less, preferably 9 or less, and still preferably 8 or less.

As described above, a small standard deviation of the luminance projection (α) means small variation in luminance.

The standard deviation of the luminance projection (α) is also an index indicating the orientation of the inorganic layered mineral (C) in the gas barrier layer 20. The smaller the standard deviation, the more inorganic layered minerals (C) are uniformly dispersed and oriented in the length direction in the gas barrier layer 20. That is, the smaller the standard deviation, the more inorganic layered minerals (C) are distributed parallel to the length direction of the gas barrier layer 20. When the inorganic layered minerals (C) are distributed parallel to the length direction of the gas barrier layer 20, gas permeation in the thickness direction of the gas barrier layer 20 can be more efficiently prevented by the inorganic layered minerals (C). Therefore, a gas barrier layer 20 having an average of the standard deviations of 10 or less is superior in gas barrier properties in high humidity conditions.

A difference between a maximum value and a minimum value of the standard deviations of the total of ten luminance projections (α) in the gas barrier layer 20 is preferably 8 or less, more preferably 7 or less, and still more preferably 6 or less.

When the difference between a maximum value and a minimum value of the standard deviations of the total of ten luminance projections (α) is the upper limit (8) or less, the gas barrier layer 20 is superior in gas barrier properties in high humidity conditions.

The lower limit of the difference between a maximum value and a minimum value of the standard deviations of the total of ten luminance projections (α) is preferably 1 or more, for example, but not limited thereto.

In the gas barrier layer 20, the average of the standard deviations of the luminance projections (β), measured by the following Measurement method 2, is preferably 2.90 or less.

<Measurement Method 2>

In the cross-section of the gas barrier layer 20 in the thickness direction, when a square region having a side length from a position at a depth of 10% from the first surface of the gas barrier layer 20 in the thickness direction of the gas barrier layer 20 to another position at a depth of 10% of the thickness of the gas barrier layer 20 in a direction from a first surface of the substrate 10 toward the first surface of the gas barrier layer 20 is defined as a measurement target region; ten of the square regions with intervals therebetween in a length direction perpendicular to the thickness direction of the gas barrier layer are selected; and a standard deviation of a luminance projection (β) in a length direction is obtained, an arithmetic mean of a plurality of the standard deviations of the ten of the luminance projections (β) is obtained as an average.

In other words, Measurement method 2 in the gas barrier film according to the present embodiment is a method in which; when a position at a depth $T_{22}$ of 10% of the thickness $T_{20}$ of the gas barrier layer 20 from the first surface of the gas barrier layer 20 in the cross-section of the gas barrier layer 20 in the thickness $T_{20}$ direction is defined as a first position, and a position at a depth $T_{24}$ of 10% of the thickness of the gas barrier layer 20 in a direction from a first surface of the substrate 10 toward the first surface of the gas barrier layer 20 is defined as a second position; a square region having a side length $T_{26}$ from the first position to the second position is defined as a measurement target region C1; ten of the square regions with intervals d2 therebetween in the length direction perpendicular to the thickness direction of the gas barrier layer 20 are selected to define a second measurement target region group C composed of the ten of the measurement target regions; and a standard deviation of a luminance projection (β) in the length direction is obtained in each of the ten of the measurement target regions C1 to C10 in the second measurement target region group C, an arithmetic mean of a plurality of the standard deviations of the ten of the luminance projections (β) in the second measurement target region group C is obtained as an average.

Figure 3:
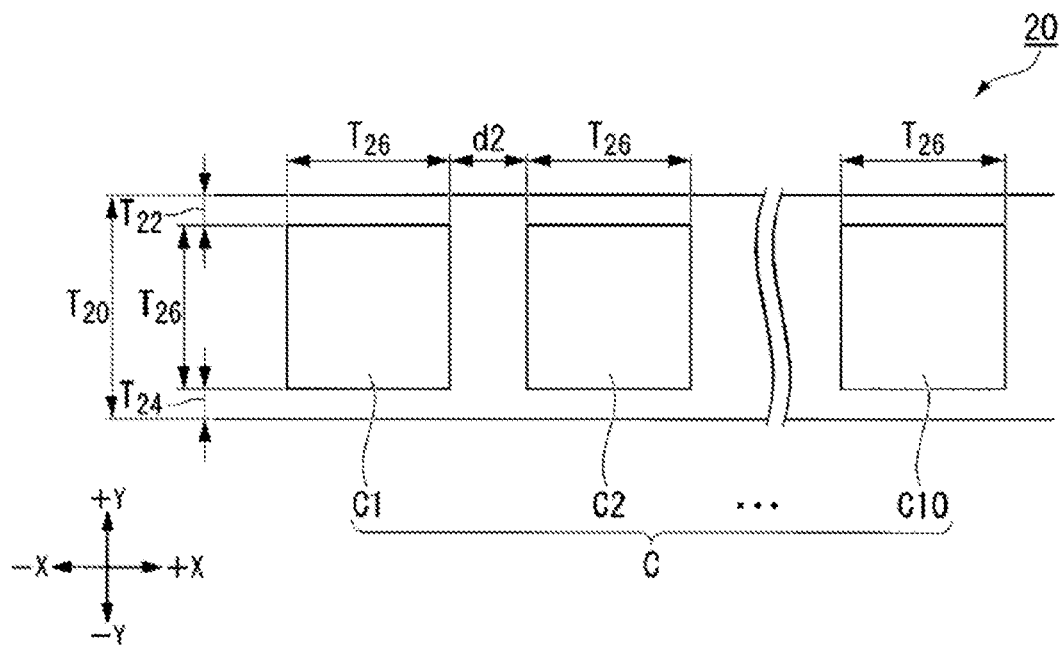
FIG. 3 is a conceptual diagram illustrating a measurement target region in Measurement method 2.

Referring to FIG. 3, Measurement method 2 is described below.

FIG. 3 is a conceptual diagram illustrating a cross section of the gas barrier layer 20 in the gas barrier film 1. In FIG. 3, the ±X direction is a length direction of the gas barrier layer 20, and the ±Y direction is a thickness direction of the gas barrier layer 20. The substrate 10 is located on the −Y side. The first surface of the gas barrier layer 20 is located on the +Y side.

A length of 10% of the thickness $T_{20}$ of the gas barrier layer 20 from the first surface of the gas barrier layer 20 is defined as $T_{22}$. Further, in the cross-section of the gas barrier layer 20 in the thickness direction, a position at a depth $T_{22}$ of 10% of the thickness $T_{20}$ of the gas barrier layer 20 from the first surface of the gas barrier layer 20 is defined as the first position.

A length of 10% of the thickness $T_{20}$ of the gas barrier layer 20 in a direction from the substrate 10 toward the first surface of the gas barrier layer 20 is defined as $T_{24}$. Further, in the cross-section of the gas barrier layer 20 in the thickness $T_{20}$ direction, a position at a depth $T_{24}$ of 10% of the thickness $T_{20}$ of the gas barrier layer 20 in a direction from the first surface of the substrate 10 toward the first surface of the gas barrier layer 20 is defined as the second position.

The side length $T_{26}$ of a square of the measurement target region is represented by the following formula:

$$T_{26} = T_{20} - T_{22} - T_{24}$$

That is, the length from the first position to the second position is defined as the side length $T_{26}$ of the measurement target region.

The length $T_{22}$ is not specifically limited, and preferably in a range of 0.01 to 0.5 μm, for example. The length $T_{24}$ is the same as the length $T_{22}$. The length $T_{22}$ and the length $T_{24}$ may be the same or different from each other.

The length $T_{26}$ is not specifically limited, and, for example, preferably in a range of 0.08 to 4.0 μm, more preferably 0.16 to 1.6 μm, and still more preferably 0.24 to 0.8 μm. When the length $T_{26}$ is the lower limit (0.08 μm) or more, the luminance projection (β) can be easily measured. When the length $T_{26}$ is the upper limit (4.0 μm) or less, the measurement target region can be easily obtained.

The square measurement target region C having the length $T_{26}$ can be optionally selected. When two or more measurement target regions C are selected, two measurement target regions C are spaced from each other in the ±X direction by a distance d2. The distance d2 is not specifically limited, and is preferably in a range of 0.1 to 10 μm, for example.

In Measurement method 2, ten measurement target regions C are selected. For example, the measurement target region closest to the −X end is defined as C1, and, from the measurement target region C1, ten measurement target regions (second measurement target region group) C are selected such that C2 to C10 are spaced from each other at the distance d2 in the +X direction. For the ten measurement target regions thus selected, the luminance in the ±Y direction is measured at predetermined intervals in the ±X direction. The luminance measurements are plotted on a plane with the ±X direction as the horizontal axis and the luminance as the vertical axis. A graph of a curve connecting the plots is referred to as a luminance projection. The luminance projection measured by the above Measurement method 2 is referred to as a luminance projection (β). The predetermined interval may be, for example, 0.1 to 10 nm, and is preferably 1 nm. The standard deviations are obtained for a total of ten luminance projections (β) in the measurement target regions C, and an arithmetic mean of the standard deviations for a total of ten luminance projections (β) in the measurement target regions C is obtained as an average.

The luminance projection (β) is obtained in the same manner as the luminance projection (α).

In Measurement method 2, the length in the ±Y direction of the measurement target region tends to be longer than that in Measurement method 1. Therefore, regardless of orientation of the inorganic layered mineral (C), the luminance in the ±Y direction tends to be easily averaged. Accordingly, the standard deviation of the luminance projection (β) is smaller than the standard deviation of the luminance projection (α).

The average of the standard deviations of the luminance projection (β) in the gas barrier layer 20 is preferably 2.90 or less, preferably 2.50 or less, and still preferably 2.00 or less.

The standard deviation of the luminance projection (β) is an index indicating the dispersion of the inorganic layered mineral (C) in the gas barrier layer 20. The smaller the standard deviation, the more inorganic layered minerals (C) are uniformly dispersed and evenly distributed in the gas barrier layer 20. When the inorganic layered minerals (C) are evenly distributed in the gas barrier layer 20, the inorganic layered minerals (C) are likely to be distributed in a direction parallel to the length direction of the gas barrier layer 20. Therefore, the gas barrier layer 20 having the average of the standard deviations of 2.90 or less is superior in gas barrier properties in high humidity conditions.

A difference between a maximum value and a minimum value of the standard deviations of the luminance projections (β) in the total of ten measurement target regions (second measurement target region group C) in the gas barrier layer 20 is preferably 3.0 or less, more preferably 2.5 or less, and still more preferably 2.0 or less.

When the difference between a maximum value and a minimum value of the standard deviations of the luminance projections (β) in the total of ten measurement target regions (second measurement target region group C) is the upper limit (3.0) or less, the gas barrier layer 20 is superior in gas barrier properties in high humidity conditions.

The lower limit of the difference between a maximum value and a minimum value of the standard deviations of the luminance projections (β) in the total of ten measurement target regions (second measurement target region group C) is preferably 0.5 or more, for example, but not limited thereto.

The gas barrier film according to the present embodiment may also be provided with, as necessary, a print layer, an anchor coat layer, overcoat layer, light-shielding layer, adhesive layer, heat-sealable thermally adhesive layer (sealant layer), and other functional layers.

For example, the gas barrier film according to the present embodiment may also include an adhesive layer and a sealant layer in this order on the first surface of the gas barrier layer.

When the gas barrier film according to the present embodiment includes a heat-sealable thermally adhesive layer, the thermally adhesive layer is preferably located on at least one outermost layer of the gas barrier film. When the gas barrier film includes the thermally adhesive layer, the gas barrier film can be hermetically sealed by heat sealing.

The thermally adhesive layer can be laminated, for example, on a surface of the laminate, which is obtained by forming a film by the coating agent according to the present embodiment on one or both surfaces of the substrate, by using known adhesives such as polyurethane, polyester, and polyether-based adhesives by known methods such as dry lamination and extrusion lamination.

EXAMPLES

The present invention will be further described in detail by using examples and comparative examples. However, the present invention is not limited to the examples described below.

Materials used for each examples are as follows.
<Materials Used>
Substrate: Biaxially stretched polypropylene film, commercial product (manufactured by AJ Plast, product name: PJ201, thickness: 20 μm)

Aqueous polyurethane resin (A): Aqueous dispersion obtained by Production example 1 described below Water soluble polymer (B): manufactured by Kuraray Co., Ltd., product name "Poval PVA-117," saponification degree 98 to 99%, polymerization degree 1700.

Inorganic layered mineral (C): Water-swellable synthetic mica, manufactured by Co-op Chemical Co., Ltd., product name "Somacif ME-100." Abbreviated as "ME-100" in Tables 1 and 2.

Inorganic layered mineral (C): Water-swellable synthetic mica, manufactured by Topy Industries, Limited, product name "NTS-5"

Preparation Example 1

45.5 g of meth xylylene diisocyanate (mXDI), 93.9 g of 1,3-bis(isocyanate methyl) cyclohexane (hydrogenated XDI), 24.8 g of ethylene glycol, 13.4 g of dimethylolpropionic acid, and 80.2 g of methyl ethyl ketone as a solvent were mixed and allowed to react under a nitrogen atmosphere at 70° C. for 5 hours to prepare a carboxyl group-containing urethane prepolymer solution.

Then, the carboxyl group-containing urethane prepolymer solution was neutralized with 9.6 g of triethylamine at 40° C.

The neutralized carboxyl group-containing urethane prepolymer solution was dispersed in 624.8 g of water by a homodisperser to perform a chain extension reaction with 21.1 g of 2-[(2-aminoethyl)amino]ethanol. Then, methyl ethyl ketone was removed to obtain an aqueous dispersion of acid group-containing polyurethane resin having a solid content of 25 mass %, an average particle size of 90 nm, and an acid value of 26.9 mgKOH/g.

Then, an aqueous dispersion of the acid group-containing polyurethane resin and γ-(2-aminoethyl)aminopropyl methyl dimethoxysilane (amine value 544 mgKOH/g) as a polyamine compound were mixed at a molar ratio of 1/1 between the acid group and the basic nitrogen atom to obtain an aqueous dispersion of the aqueous polyurethane resin (A) of Production example 1.

<Preparation of Coating Agent 1>

The inorganic layered mineral (C) (Somacif ME-100) was diluted to 8 mass % with ion-exchanged water, dispersed by a bead mill disperser (Viscomill UVM-5, manufactured by Aimex Co., Ltd.), and processed with a laser diffraction particle size analyzer (Microtrac MT3300 manufactured by Nikkiso Co., Ltd.) until the particle size became 3 μm or less. The dispersion solution of the inorganic layered mineral (C) thus obtained, the aqueous dispersion of the aqueous polyurethane resin (A), and the water-soluble polymer (B) were blended at the solid content ratio (A):(B):(C) of 20:70:10, and heated and mixed at 80° C. Then, the mixture was cooled to room temperature (30° C.), and diluted with ion-exchanged water and isopropanol so that isopropanol accounts for 10 mass % of the entire aqueous medium solvent, and the final solid content concentration becomes 9 mass %. Thus, a coating agent 1 was prepared.

Example 1

The coating agent 1 thus obtained was applied to the corona treatment surface of the substrate by gravure coating at the dry thickness of 0.6 μm, and then the substrate was passed through an oven at 90° C. for 10 seconds to form a gas barrier layer. Thus, the gas barrier film was obtained. The oxygen permeability of the gas barrier film thus obtained was measured. The cross-section of the gas barrier film was processed by a focused ion beam device/electron beam processing observation device (NB5000 manufactured by Hitachi High Technologies Corporation) to obtain a thin sample with a thickness of 100 to 150 nm. The thin sample was observed with a scanning electron microscope (SU8020 manufactured by Hitachi High Technologies Corporation; hereinafter also referred to as STEM) (FIG. 4) to perform image analysis. Tables 1 and 2 show the results.

<Preparation of Coating Agent 2>

The inorganic layered mineral (C) (Somacif ME-100) was diluted to 8 mass % with ion-exchanged water, dispersed by a homogenizer (DX-1, manufactured by Nippon Seiki Co., Ltd.), and processed until the particle size became 3 μm or less. The dispersion solution of the inorganic layered mineral (C) thus obtained, the aqueous dispersion of the aqueous polyurethane resin (A), and the water-soluble polymer (B) were blended at the solid content ratio (A):(B):(C) of 20:70:10, and heated and mixed at 80° C. Then, the mixture was cooled to room temperature (30° C.), and diluted with ion-exchanged water and isopropanol so that isopropanol accounts for 10 mass % of the entire aqueous medium solvent, and the final solid content concentration becomes 9 mass %. Thus, a coating agent 2 was prepared.

Comparative Example 1

Figure 5:
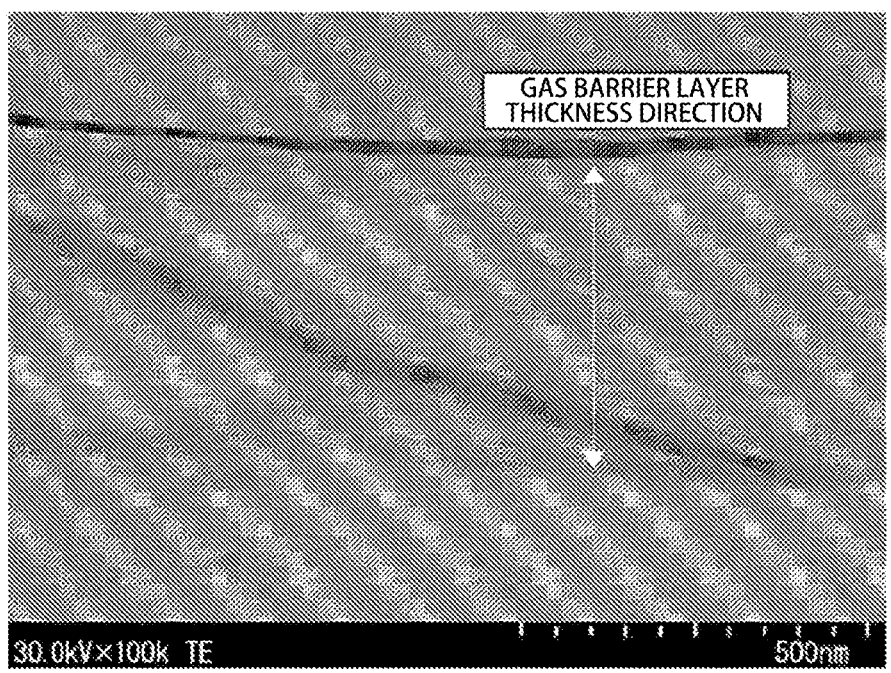
FIG. 5 is an image of a cross-section of a gas barrier film according to Comparative example 1.

The coating agent 2 was applied in the same manner as Example 1, and evaluated. An observation image by a scanning electron microscope was shown in FIG. 5. The results of image analysis were shown in Tables 1 and 2.

<Preparation of Coating Agent 3>

A coating agent 3 was prepared in the same manner as the coating agent 1 except that the inorganic layered mineral (C) (Somacif ME-100) was diluted to 15 mass % with ion-exchanged water.

Example 2

The coating agent 3 was applied in the same manner as Example 1, and evaluated. Tables 1 and 2 show the results of image analysis.

<Preparation of Coating Agent 4>

A coating agent 4 was prepared in the same manner as the coating agent 2 except that the inorganic layered mineral (C) (Somacif ME-100) was diluted to 15 mass % with ion-exchanged water.

Comparative Example 2

The coating agent 4 was applied in the same manner as Example 1, and evaluated. Tables 1 and 2 show the results of image analysis.

<Preparation of Coating Agent 5>

A coating agent 5 was prepared in the same manner as the coating agent 1 except that the inorganic layered mineral (C) (Somacif ME-100) was diluted to 3 mass % with ion-exchanged water.

Example 3

The coating agent 5 was applied in the same manner as Example 1, and evaluated. Tables 1 and 2 show the results of image analysis.

<Preparation of Coating Agent 6>

A coating agent 6 was prepared in the same manner as the coating agent 2 except that the inorganic layered mineral (C) (Somacif ME-100) was diluted to 3 mass % with ion-exchanged water.

Comparative Example 3

The coating agent 6 was applied in the same manner as Example 1, and evaluated. Tables 1 and 2 show the results of image analysis.

<Preparation of Coating Agent 7>

A coating agent 7 was prepared in the same manner as the coating agent 1 except that NTS-5 was used as the inorganic layered mineral (C) instead of Somacif ME-100.

Example 4

The coating agent 7 was applied in the same manner as Example 1, and evaluated. Tables 1 and 2 show the results of image analysis.

<Evaluation>

(Oxygen Permeability)

For the gas barrier films of the respective examples, oxygen permeability ($cm^3/(m^2 \cdot day \cdot MPa)$) was measured by using an oxygen permeability measuring device (OXTRAN-2/20 manufactured by MOCON) under an atmosphere of 30° C. and relative humidity of 60%. Table 1 shows the results.

(Cross-Sectional Observation and Image Analysis)

For the cross-sections of the thin samples including the gas barrier layers of the respective examples, an observation image was obtained under the conditions of accelerating voltage: 30 kV and magnification: 100,000 times by using a transmission electron detector of a STEM. The observation image was subjected to grayscale image processing by using an image processing software (Scion ImageJ), and the lightness of image was adjusted so that the average in the luminance histogram of the gas barrier layer became equal to a median value of the luminance. In the respective measurement target regions selected in Measurement method 1, the luminance projection (α) in the length direction of the respective measurement target regions was measured, and the standard deviation thereof was obtained. Table 1 shows the results. In the table, "n=1 to n=10" represents the respective measurement target regions.

In the respective measurement target regions selected in Measurement method 2, the luminance projection (β) in the length direction of the respective measurement target regions was measured, and the standard deviation thereof was obtained. Table 2 shows the results. In the table, "n=1 to n=10" represents the respective measurement target regions.

TABLE 1

| | | Example 1 | Comparative Example 1 | Example 2 | Comparative Example 2 | Example 3 | Comparative Example 3 | Example 4 |
|---|---|---|---|---|---|---|---|---|
| Inorganic layered mineral (C) | ME-100 (mass %) | 8 | 8 | 15 | 15 | 3 | 3 | — |
| | NTS-5 (mass %) | — | — | — | — | — | — | 8 |
| Type of coating agent | | 1 | 2 | 3 | 4 | 5 | 6 | 7 |
| Standard deviation of luminance projection (α) | n = 1 | 4.32 | 8.09 | 4.28 | 13.70 | 6.44 | 8.75 | 4.92 |
| | n = 2 | 7.30 | 12.04 | 7.61 | 5.79 | 9.33 | 12.21 | 6.70 |
| | n = 3 | 5.56 | 13.09 | 7.47 | 11.44 | 9.15 | 11.29 | 5.79 |
| | n = 4 | 4.97 | 13.94 | 2.66 | 15.12 | 7.95 | 7.91 | 6.36 |
| | n = 5 | 7.21 | 14.27 | 2.44 | 11.50 | 8.51 | 16.37 | 8.53 |
| | n = 6 | 8.66 | 9.67 | 2.66 | 11.41 | 7.35 | 11.20 | 8.04 |
| | n = 7 | 8.14 | 16.98 | 5.14 | 11.77 | 9.75 | 9.00 | 5.86 |
| | n = 8 | 7.06 | 16.78 | 5.36 | 8.31 | 11.81 | 8.99 | 8.09 |
| | n = 9 | 8.51 | 23.24 | 5.18 | 7.35 | 4.94 | 11.41 | 6.81 |
| | n = 10 | 3.47 | 18.75 | 2.71 | 19.91 | 9.01 | 12.68 | 6.91 |
| | Minimum | 3.47 | 8.09 | 2.44 | 5.79 | 4.94 | 7.91 | 4.92 |
| | Maximum | 8.66 | 23.24 | 7.61 | 19.91 | 11.81 | 16.37 | 8.53 |
| | Average | 6.52 | 14.69 | 4.55 | 11.63 | 8.42 | 10.98 | 6.80 |
| | Difference between maximum and minimum | 5.19 | 15.14 | 5.17 | 14.11 | 6.87 | 8.45 | 3.62 |
| Oxygen permeability ($cm^3/(m^2 \cdot day \cdot MPa)$) | | 19 | 85 | 8 | 45 | 57 | 142 | 14 |

TABLE 2

| | | Example 1 | Comparative Example 1 | Example 2 | Comparative Example 2 | Example 3 | Comparative Example 3 | Example 4 |
|---|---|---|---|---|---|---|---|---|
| Inorganic layered mineral (C) | ME-100 (mass %) | 8 | 8 | 15 | 15 | 3 | 3 | — |
| | NTS-5 (mass %) | — | — | — | — | — | — | 8 |
| Type of coating agent | | 1 | 2 | 3 | 4 | 5 | 6 | 7 |
| Standard deviation of luminance projection (β) | n = 1 | 1.40 | 2.52 | 1.44 | 5.60 | 2.80 | 4.00 | 1.24 |
| | n = 2 | 2.94 | 11.18 | 1.55 | 2.63 | 2.91 | 3.47 | 1.76 |
| | n = 3 | 1.41 | 2.65 | 3.84 | 2.56 | 3.93 | 2.99 | 1.69 |
| | n = 4 | 4.13 | 2.90 | 1.09 | 2.18 | 2.55 | 5.72 | 0.98 |
| | n = 5 | 2.34 | 2.92 | 1.26 | 3.23 | 2.41 | 3.04 | 1.37 |
| | n = 6 | 2.35 | 3.72 | 1.04 | 3.26 | 2.06 | 5.29 | 2.36 |
| | n = 7 | 1.87 | 3.40 | 1.41 | 1.52 | 2.62 | 5.98 | 1.19 |
| | n = 8 | 3.03 | 3.10 | 1.45 | 2.37 | 1.67 | 5.72 | 2.45 |
| | n = 9 | 1.66 | 4.34 | 2.74 | 3.24 | 2.56 | 3.00 | 4.31 |
| | n = 10 | 3.55 | 2.18 | 1.30 | 2.69 | 4.54 | 2.80 | 2.32 |
| | Minimum | 1.40 | 2.18 | 1.04 | 1.52 | 1.67 | 2.80 | 0.98 |
| | Maximum | 4.13 | 11.18 | 3.84 | 5.60 | 4.54 | 5.98 | 4.31 |
| | Average | 2.47 | 3.89 | 1.71 | 2.93 | 2.81 | 4.20 | 1.97 |
| | Difference between maximum and minimum | 2.72 | 9.00 | 2.80 | 4.07 | 2.86 | 3.18 | 3.34 |

As seen from the results in Tables 1 and 2, the oxygen permeability of the gas barrier films of Examples 1 to 4 under an atmosphere of 30° C. and relative humidity of 60% was 8 to 57 cm$^3$/(m$^2$·day·MPa), showing good gas barrier properties. In particular, it was found that the gas barrier films of Examples 1 to 3 exhibited significantly improved gas barrier properties compared with the gas barrier films of Comparative examples 1 to 3 having the same content of the inorganic layered mineral (C) as Examples 1 to 3, respectively.

On the other hand, the oxygen permeability of Comparative example 1 to 3 was 45 to 142 cm$^3$/(m$^2$·day·MPa), failing to show good gas barrier properties.

INDUSTRIAL APPLICABILITY

The gas barrier film of the present invention shows high gas barrier properties even in a high humidity atmosphere.

Accordingly, when used as a packaging material that accommodates the contents, the contents can be sufficiently prevented from being deteriorated due to water vapor or the like. Therefore, the gas barrier film of the present invention is advantageous as a packaging material.

The gas barrier film of the present invention can also be used for applications other than packaging materials. Examples of the applications other than packaging materials include films for electronic devices, films for solar batteries, various functional films for fuel cells, and substrate films.

REFERENCE SIGNS LIST

1 . . . Gas barrier film; 10 . . . Substrate; 20 . . . Gas barrier layer.

What is claimed is:

1. A gas barrier film, comprising:
a substrate; and
a gas barrier layer located on at least one surface of the substrate, the gas barrier layer formed by coating on the at least one surface of the substrate a coating agent, wherein solid ingredients of the coating agent consist of an aqueous polyurethane resin (A) that contains an acid group-containing polyurethane resin and a polyamine compound, a water soluble polymer (B), and an inorganic layered mineral (C), wherein,
when a region from a top to a bottom of a cross-section of the gas barrier layer in a thickness direction, which is defined as a first region, is equally divided in the thickness direction into 11 strip regions, and a region different from the first region from a top to a bottom of a cross-section of the gas barrier layer in the thickness direction, which is defined as a second region, is equally divided in the thickness direction into 11 strip regions to thereby define a total of 22 strip regions;
a portion having a length of 1 μm in a length direction perpendicular to the thickness direction in each of second, fourth, sixth, eighth, and tenth strip regions from a first surface of the gas barrier layer among the 11 strip regions in the first region, and a portion having a length of 1 μm in a length direction perpendicular to the thickness direction each of second, fourth, sixth, eighth, and tenth strip regions from the first surface of the gas barrier layer among the 11 strip regions in the second region is each defined as a measurement target region to thereby select ten of the measurement target regions that constitute a first measurement target region group;
a standard deviation of a luminance projection (α) in the length direction is obtained in each of the ten of the measurement target regions in the first measurement target region group; and
an arithmetic mean of a plurality of the standard deviations of the ten of the luminance projections (α) in the first measurement target region group is obtained as an average,
the average of the plurality of the standard deviations of the ten of the luminance projections (α) in the first measurement target region group in the gas barrier layer is 10 or less, wherein the inorganic layered mineral (C) is water-swellable synthetic mica and wherein an oxygen permeability of the gas barrier film is 8 to 57 cm$^3$/(m$^2$·day·MPa).

2. The gas barrier film of claim 1, wherein a difference between a maximum value and a minimum value of the standard deviations of the total of ten luminance projections (α) is 8 or less.

3. The gas barrier film of claim 1, wherein,
when a position at a depth of 10% of the thickness of the gas barrier layer from the first surface of the gas barrier layer in a cross-section of the gas barrier layer in the thickness direction is defined as a first position, and a position at a depth of 10% of the thickness of the gas barrier layer in the direction from a first surface of the substrate toward the first surface of the gas barrier layer in a cross-section of the gas barrier layer in the thickness direction is defined as a second position;
a square region having a side length from the first position to the second position is defined as a measurement target region;
ten of the square regions with intervals therebetween in the length direction perpendicular to the thickness direction of the gas barrier layer are selected to define a second measurement target region group composed of the ten of the measurement target regions;
a standard deviation of a luminance projection (β) in the length direction is obtained in each of the ten of the measurement target regions in the second measurement target region group; and
an arithmetic mean of a plurality of the standard deviations of the ten of the luminance projections (β) in the second measurement target region group is obtained as an average,
the average of the plurality of the standard deviations of the ten of the luminance projections (β) in the second measurement target region group in the gas barrier layer is 2.90 or less.

4. The gas barrier film of claim 3, wherein a difference between a maximum value and a minimum value of the standard deviations of the total of ten luminance projections (β) is 3.0 or less.

5. The gas barrier film of claim 1, wherein
a content of the water soluble polymer (B) to a total mass of the gas barrier layer is in a range of 25 to 80 mass %, and
a content of the inorganic layered mineral (C) to a total mass of the gas barrier layer is in a range of 3 to 20 mass %.

6. The gas barrier film of claim 1, wherein an adhesive layer and a sealant layer are provided in this order on the first surface of the gas barrier layer.

7. The gas barrier film of claim 1, wherein the oxygen permeability of the gas barrier film is 8 to 19 cm$^3$/(m$^2$·day·MPa).

8. A gas barrier film, comprising:
a substrate; and
a gas barrier layer located on at least one surface of the substrate, the gas barrier layer formed by coating on the at least one surface of the substrate a coating agent, wherein solid ingredients of the coating agent consist of an aqueous polyurethane resin (A) that contains an acid group-containing polyurethane resin and a polyamine compound, a water soluble polymer (B), and an inorganic layered mineral (C), wherein,
when a region from a top to a bottom of a cross-section of the gas barrier layer in a thickness direction, which is defined as a first region, is equally divided in the thickness direction into 11 strip regions, and a region different from the first region from a top to a bottom of a cross-section of the gas barrier layer in the thickness direction, which is defined as a second region, is equally divided in the thickness direction into 11 strip regions to thereby define a total of 22 strip regions;
a portion having a length of 1 µm in a length direction perpendicular to the thickness direction in each of second, fourth, sixth, eighth, and tenth strip regions from a first surface of the gas barrier layer among the 11 strip regions in the first region, and a portion having a length of 1 µm in a length direction perpendicular to the thickness direction each of second, fourth, sixth, eighth, and tenth strip regions from the first surface of the gas barrier layer among the 11 strip regions in the second region is each defined as a measurement target region to thereby select ten of the measurement target regions that constitute a first measurement target region group;
a standard deviation of a luminance projection ($\alpha$) in the length direction is obtained in each of the ten of the measurement target regions in the first measurement target region group; and
an arithmetic mean of a plurality of the standard deviations of the ten of the luminance projections ($\alpha$) in the first measurement target region group is obtained as an average,
the average of the plurality of the standard deviations of the ten of the luminance projections ($\alpha$) in the first measurement target region group in the gas barrier layer is 10 or less, wherein a content of the inorganic layered mineral (C) to a total mass of the gas barrier layer is in a range of 3 to 7 mass %.

9. The gas barrier film of claim 8, wherein the content of the inorganic layered mineral (C) to the total mass of the gas barrier layer is in a range of 3 to 5 mass %.

10. The gas barrier film of claim 8, wherein the inorganic layered mineral (C) is water-swellable synthetic mica.

11. The gas barrier film of claim 9, wherein the inorganic layered mineral (C) is water-swellable synthetic mica.

12. The gas barrier film of claim 8, wherein a difference between a maximum value and a minimum value of the standard deviations of the total of ten luminance projections ($\alpha$) is 8 or less.

13. The gas barrier film of claim 8, wherein,
when a position at a depth of 10% of the thickness of the gas barrier layer from the first surface of the gas barrier layer in a cross-section of the gas barrier layer in the thickness direction is defined as a first position, and a position at a depth of 10% of the thickness of the gas barrier layer in the direction from a first surface of the substrate toward the first surface of the gas barrier layer in a cross-section of the gas barrier layer in the thickness direction is defined as a second position;
a square region having a side length from the first position to the second position is defined as a measurement target region;
ten of the square regions with intervals therebetween in the length direction perpendicular to the thickness direction of the gas barrier layer are selected to define a second measurement target region group composed of the ten of the measurement target regions;
a standard deviation of a luminance projection ($\beta$) in the length direction is obtained in each of the ten of the measurement target regions in the second measurement target region group; and
an arithmetic mean of a plurality of the standard deviations of the ten of the luminance projections ($\beta$) in the second measurement target region group is obtained as an average,
the average of the plurality of the standard deviations of the ten of the luminance projections ($\beta$) in the second measurement target region group in the gas barrier layer is 2.90 or less.

14. The gas barrier film of claim 13, wherein a difference between a maximum value and a minimum value of the standard deviations of the total of ten luminance projections ($\beta$) is 3.0 or less.

15. The gas barrier film of claim 8, wherein
a content of the water soluble polymer (B) to a total mass of the gas barrier layer is in a range of 25 to 80 mass %.

16. The gas barrier film of claim 8, wherein an adhesive layer and a sealant layer are provided in this order on the first surface of the gas barrier layer.

* * * * *